(No Model.)

G. McDONALD.
STONE DRESSING HAMMER.

No. 477,017. Patented June 14, 1892.

Witnesses:
Frank C. Curtin
John T. Booth

Inventor:
George McDonald
by Geo. A. Mosher
Atty.

UNITED STATES PATENT OFFICE.

GEORGE McDONALD, OF TROY, NEW YORK.

STONE-DRESSING HAMMER.

SPECIFICATION forming part of Letters Patent No. 477,017, dated June 14, 1892.

Application filed July 3, 1891. Serial No. 398,379. (No model.)

*To all whom it may concern:*

Be it known that I, GEORGE McDONALD, a citizen of the United States, residing at Troy, county of Rensselaer, and State of New York, have invented certain new and useful Improvements in Stone-Dressing Hammers, of which the following is a specification.

My invention relates to such improvements; and it consists of the novel construction and combination of parts hereinafter described and subsequently claimed.

Reference may be had to the accompanying drawings, and the letters of reference marked thereon, which form a part of this specification.

Similar letters refer to similar parts in the several figures therein.

Figure 1:
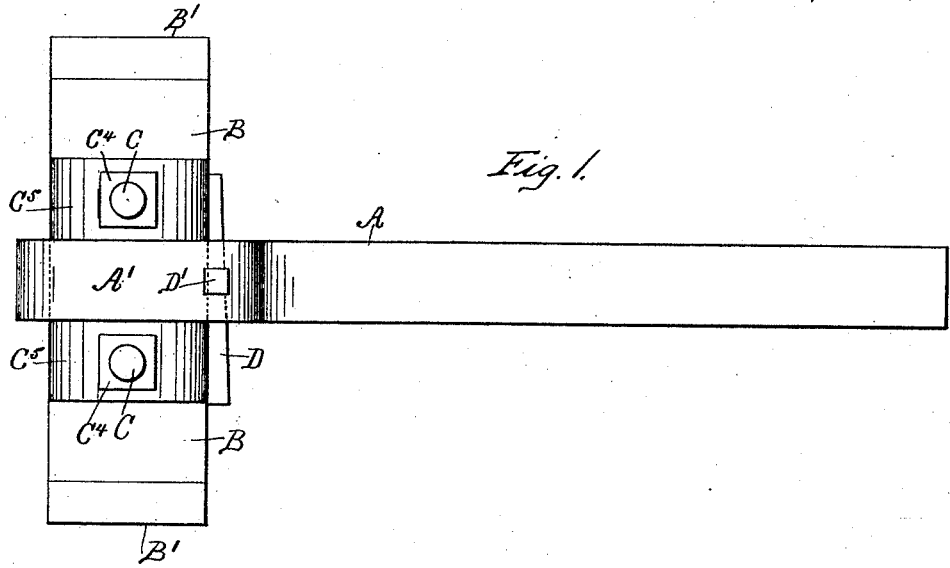
Figure 2:
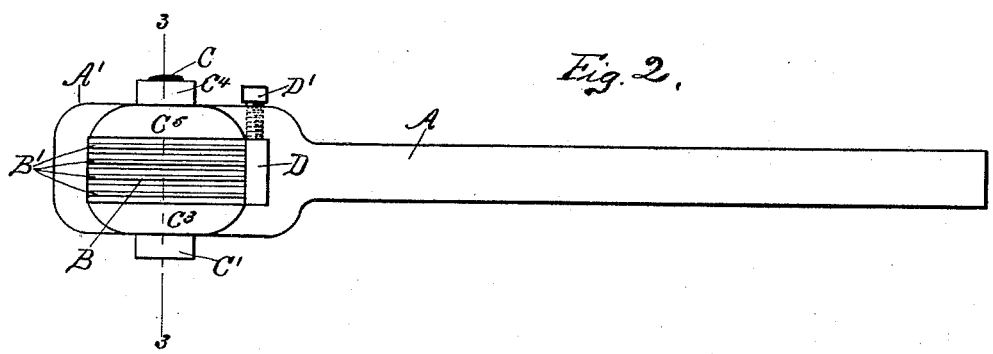
Figure 3:
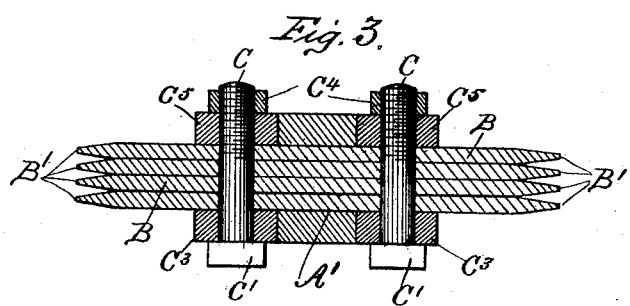

Figure 1 of the drawings is a view in side elevation of my improved hammer. Fig. 2 is a top plan view of the same. Fig. 3 is a vertical cross-section taken on the broken line 3 3 in Fig. 2.

The handle A has an eye A' in one end, adapted to receive a plurality of blades B, having a cutting-edge B' on each end of the several blades. The blades are inserted in the eye and tightly bound together by means of the bolts C, each provided with a square head C' on one end and screw-threads on the other end. The bolt-heads engage with the elongated washers $C^3$ on one side of the blades and screw into the nuts $C^4$, which engage with the elongated washers $C^5$ on the other side of the blades. The bolt-holes are so located that the nuts and washers engage with the eye-inclosing portion of the handle on the opposite sides of the bundle of blades and hold them securely within the eye. I am thus able to easily and quickly bind together a plurality of detachable blades and form them into a solid compact head and at the same time secure them upon the handle.

When desired, as in case an insufficient number of blades to fill the eye are employed, the head may be additionally secured within the eye by means of a wedge D, driven into the eye between the edges of the blades and an end wall of the eye. The wedge may be held in place by means of a set-screw D', as shown.

The heads of stone-dressing hammers are provided with separate detachable blades to permit of their removal for sharpening when dulled by use and renewal when worn out or broken. As generally constructed heretofore, short blades have been made to project from opposite sides of a supporting head or handle and provided with only one cutting-edge each. The heels of such blades on one side of the handle were compelled to resist the inertia of the head and blades on the other side at every blow and were soon battered or broken and rendered worthless.

I am aware that blades with cutting-edges on their opposite ends have been clamped together in a sectional box and secured upon a handle passed through a central aperture in the blades and box-sections by means of a wedge-shaped key; but such a form of construction necessitated a heavy and unwieldy head and battered the handle so that it was difficult or impossible to detach the blades for sharpening.

By clamping the blades firmly together by means of a pair of screw-bolts, as I have shown and described, they cannot move one upon another while in use, but form a solid compact head, which can be manipulated by a light handle that is not battered by the blades while in use, and the blades can be easily and quickly detached from the handle and from each other for renewal or for sharpening.

When desired, the elongated washers $C^5$ may be screw-threaded and the nuts $C^4$ dispensed with.

What I claim as new, and desire to secure by Letters Patent, is—

1. In a stone-hammer, a hammer-head composed of a plurality of blades severally beveled or sharpened at each end and detachably bound together by two screw-threaded bolts, each bolt passing through an elongated washer extending transversely across the outer blade on one side of the head through the several blades and secured to a similar washer or nut on the opposite side of the head, substantially as set forth.

2. In a stone-hammer, the combination of a handle having an eye at one end, blades situated in said eye and having bolt-holes suitably located, washers abutting against each edge of each side wall of the eye and resting on the blades, and screw-bolts passing through each pair of washers and through the blades, whereby said blades are bolted together and to the washers and the latter are held solidly against each edge of each side wall of the eye, substantially as set forth.

In testimony whereof I have hereunto set my hand this 30th day of June, 1891.

GEORGE McDONALD.

Witnesses:
FRANK C. CURTIS,
JOHN T. BOOTH.